July 25, 1961   J. SCRABONIA   2,993,985
SCALE ILLUMINATOR ASSEMBLY
Filed Dec. 3, 1958   2 Sheets-Sheet 1
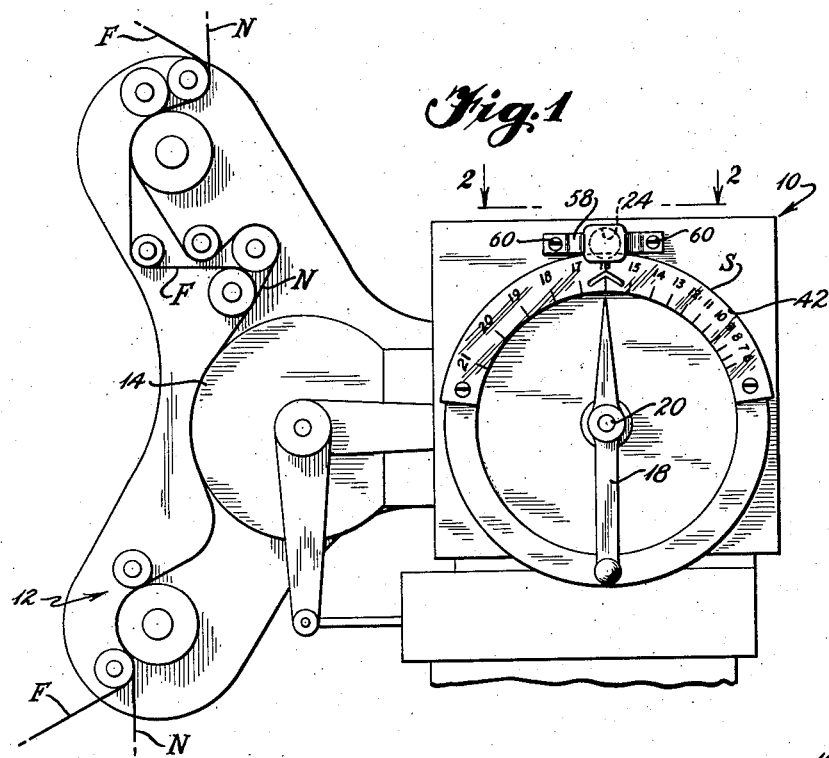
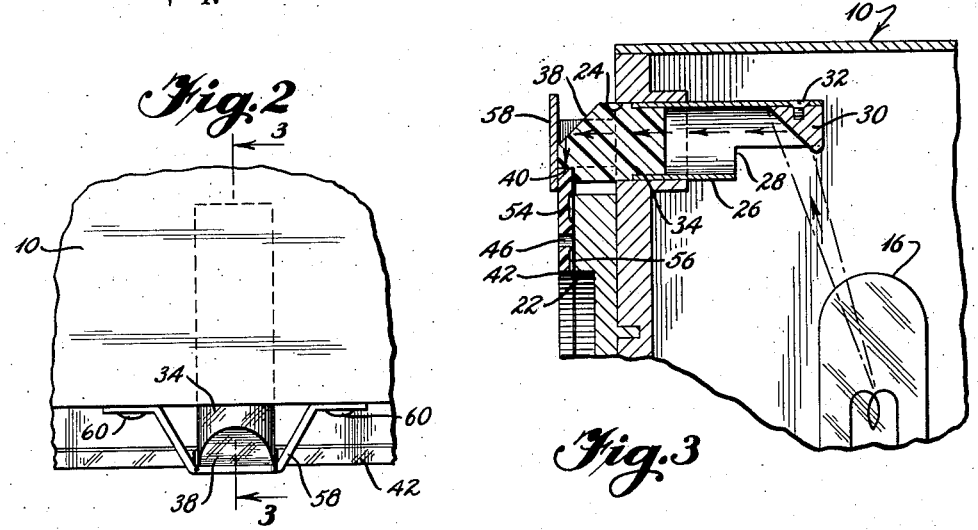
INVENTOR
Joseph Scrabonia
BY
Mead, Browne, Schuyler & Beveridge
ATTORNEYS July 25, 1961     J. SCRABONIA     2,993,985
SCALE ILLUMINATOR ASSEMBLY
Filed Dec. 3, 1958     2 Sheets-Sheet 2
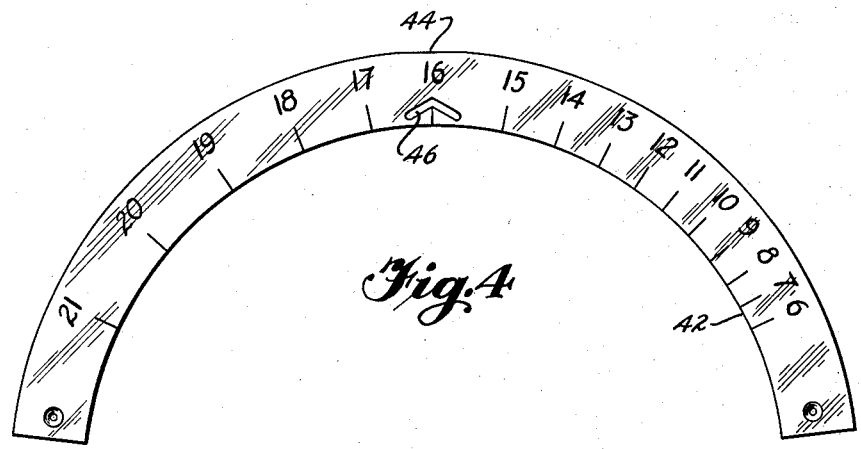
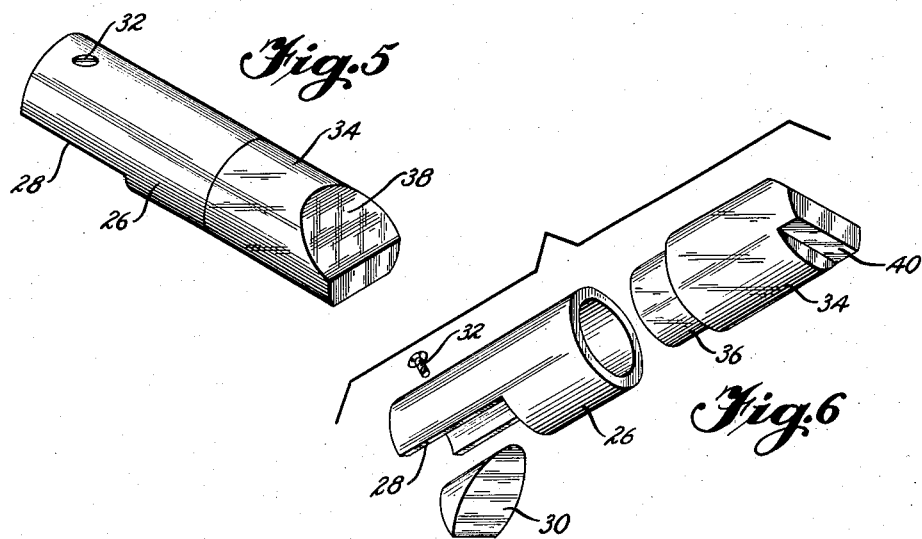
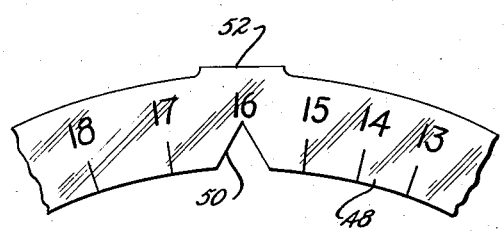
INVENTOR
Joseph Scrabonia
BY
ATTORNEYS United States Patent Office 2,993,985
Patented July 25, 1961

2,993,985
SCALE ILLUMINATOR ASSEMBLY
Joseph Scrabonia, 18 Scarcliffe Drive, Malverne, N.Y.
Filed Dec. 3, 1958, Ser. No. 777,913
1 Claim. (Cl. 240—2.1)

This invention relates to improvements in scale illuminator assemblies and more particularly to those especially adapted for use in situations permitting a minimum of extraneous light. The invention is most readily adaptable to assemblies which are incorporated in equipment normally employed in photographic darkrooms or the like. An example of an assembly in which the present invention may be embodied is the illuminating means for a shutter index dial of a motion picture film printing machine.

Conventional motion picture film printing machines normally include external control knobs or other devices having scales or indexes to indicate the various settings or conditions under which the machines are operating. Since it is necessary to maintain the lowest possible level of illumination in the darkroom, it is difficult to provide satisfactory illumination for the scales or indexes without risk of exposure of other photosensitive materials in the room. The foregoing conditions are encountered, for example, in the use of continuous printers for motion picture films. In apparatus of this type the film to be printed is fed through the light-tight box within which it is exposed to a printing lamp or light source for a period of time, selected by operation of an exposure index pointer or scale which is located at the exterior of the housing.

In conventional devices of the type described above, illumination of an arcuate or semi-circular scale is normally derived from an amber or green safelight mounted above the markings. A ruby-colored light lens located in the wall of the housing approximately midway of the ends of the scale enables the operator to determine if the lamp within the housing is lit. Since the intensity of the light from these sources is substantially reduced and the color thereof is modified, it is extremely difficult to read the scale at any substantial distance from the light sources, often causing the operator to engage the wrong shutter numeral.

It is a primary object of the invention, to therefore, provide an accessory in the nature of a scale illuminator assembly adapted for use in darkrooms or the like by means of which the full length of a scale may be illuminated without unduly raising the level of illumination in the room and without employing means for modifying the color qualities of the light thus utilized.

Still another object of the invention is to provide a scale illuminator in accordance with the above object which may be readily adapted to existing darkroom apparatus without substantial modification of such apparatus.

Still another object of the invention is to provide a scale illuminator assembly in accordance with the foregoing objects which is of relatively simple and inexpensive construction.

Further objects and advantages of the invention will become apparent by reference to the following specification taken in conjunction with the accompanying drawings.

In the drawings:
FIG. 1 is a side elevational view of a portion of a photographic printing machine embodying the invention;
FIG. 2 is a plan view of the scale illuminator assembly of the present invention as seen from line 2—2 of FIG. 1;
FIG. 3 is a cross sectional view of the scale illuminator assembly taken along the line 3—3 of FIG. 2;
FIG. 4 is a front view of the scale plate of FIG. 1;
FIG. 5 is a perspective view of a sub-assembly of the scale illuminator;
FIG. 6 is an exploded perspective view of the sub-assembly of FIG. 5; and
FIG. 7 is a partial front view of a modified form of scale plate of the type shown in FIG. 4.

In FIG. 1, the invention is shown as being applied to a continuous printer for motion picture film which includes a light-tight housing designated generally 10 and suitable means designated generally 12 for feeding a negative N and film F, to be printed, through an apertured drum 14 within which film F is exposed, through negative N, to light received from a light source 16 (FIG. 3) located within housing 10. The amount of exposure is determined by an adjustable shutter located within drum 14, the shutter opening being adjusted by an index pointer 18 mounted on housing 10 for pivotal movement to rotate a shaft 20 which is coupled to adjust the shutter opening through suitable linkage. To accurately indicate the position of the shutter opening, a scale S is mounted upon housing 10. A typical printer of the type illustrated is available commercially as "Bell & Howell" Model D Continuous Printer (35 mm. semi-automatic).

Ordinarily, the markings of scale S are engraved directly upon a metal ring 22 (FIG. 3) mounted on the side of the housing. Housing 10 is usually formed with a window or opening 24 located midway between the ends of the semi-circular scale. In the conventional device, opening 24 has inserted therein or is covered with a ruby-colored lens (not shown) which serves the purpose of informing the operator that light source 16 is on. The safelight (not shown) furnishes the only exterior illumination by which the index scale may be read. In practice, the relatively low level of intensity and the color quality of the illumination provided through the safelight makes it extremely difficult to read scale S, especially when it is desired to make a setting near either of the extreme ends of the scale. This often results in improper operation of the printer due to engagement of the wrong shutter numeral.

To overcome the aforementioned lack of illumination, the present invention contemplates that the conventional ruby light window be replaced by the scale illuminator assembly described below.

Referring now to FIGS. 5 and 6, the scale illuminator assembly includes a hollow tubular metallic member 26 which is cut away as at 28 to accommodate a bevelled chrome-plated steel mirror-like reflector 30 which is held in fixed position within tubular member 26 as by an adjustment screw 32 which may be threaded therein. At the opposite end of tubular member 26 a cylindrical light transmitting and reflecting member 34 of transparent and translucent material is mounted on member 26 by frictional engagement between member 26 and a reduced diameter section 36 which is formed to fit snugly within member 26.

The projecting surface of cylindrical member 34 is shaped to be continuous or flush with the outer surface of member 26 so that the sub-assembly may be snugly received within opening 24 in housing 10 as best seen in FIG. 3. Member 34 is preferably constructed from a transparent, translucent plastic material such as polystyrene or polymethacrylate. One example of a suitable material is that sold under the trademark "Plexiglas."

At its outer end, cylindrical member 34 is formed with a bevelled plane surface 38 which is inclined at an angle of approximately 45° to the longitudinal axis of cylindrical member 34. A transverse notch is cut in the end of member 34 diametrically opposite the bevelled plane surface 38 to provide a flat surface 40.

To assist in transmitting light over the entire length of the scale, a supplemental scale plate 42 is constructed as illustrated in FIG. 4. Scale plate 42 is semi-circular and is constructed of the same transparent material as that employed in member 34. A flattened surface 44 is formed midway between the opposite ends of scale plate 42 to lie substantially in face-to-face engagement with surface 40 of member 34 when the scale plate is assembled upon the housing as shown in FIGS. 1 and 3.

Directly below flattened surface 44, a light reflecting surface is formed by cutting in the scale plate an opening in the general form of an inverted V as at 46. Preferably, the vertex of the opening is aligned with the central axis of member 34 and centrally of surface 40. The exposed surfaces defining the opening are oriented to reflect light passing downwardly through surface 44 outwardly toward the respective ends of scale plate 42. In the modified scale plate 48 of FIG. 7, the light reflecting surfaces are formed by cutting a notch 50 in the lower edge of the scale plate immediately below a flattened surface 52 on its upper periphery. As in the case of opening 46, the vertex of notch 50 is aligned with the axis of member 34 and centrally of surface 40. Preferably, both forms of scale plates have suitable scale markings engraved on their rearmost surfaces as indicated at 54 and 56 in FIG. 3.

If desired, a small metallic bracket 58 may be mounted upon housing 10 as by bolts 60 to function as a light shield as well as a means for retaining the assembly in the aperture in the housing.

With the parts assembled as shown in FIGS. 1-3, light from light source 16 is directed by reflector 30 axially of tubular member 26 as indicated by the arrows shown in FIG. 3. The reflected light passes through transparent member 34 and is largely reflected from bevelled surface 38 at an angle of approximately 90° from the axis of member 34 into a direction toward the scale 42. The flattened surface 40 on the lower side of member 34, being in abutting engagement with flattened surface 44 on scale plate 42, enables the light to be reflected downwardly from surface 38 into scale plate 42 in a downward direction. When the light strikes the exposed surfaces of opening 46, it is reflected outwardly in opposite directions along scale plate 42. The inner and outer peripheral edges of scale plate 42 may also serve as reflectors whereby the light transmitted through member 34 and reflected downwardly into scale plate 42 spreads over substantially the entire extent of the scale plate. In this fashion, satisfactory illumination is achieved even at the outermost ends of scale plate 42.

A similar dispersion of the light is obtained by employing the modified form of scale plate shown in FIG. 7.

While but two embodiments of the invention have been disclosed, it will be apparent to those skilled in the art that the disclosed embodiments may be modified. Therefore, the foregoing description should be considered exemplary rather than limiting, and the true scope of the invention is that defined in the following claim.

What is claimed is:

In combination with a housing having a light source in its interior and an elongate scale located on the exterior of a wall of said housing, said housing having an opening extending through said wall adjacent the midpoint of said elongate scale; a scale illuminator assembly for transmitting light from said light source to said scale comprising a tubular member mounted in said opening, a cylindrical member of light transmitting material seated within said tubular member to project axially through said wall, reflecting means at the inner end of said tubular member for reflecting light from said light source into paths extending axially through said cylindrical member, a bevelled reflecting surface on the outer end of said cylindrical member disposed to reflect light passing outwardly through said cylindrical member into parallel paths perpendicular to the axis of the cylindrical member, a flattened surface on the side of said cylindrical member opposite said bevelled surface lying in a plane perpendicular to the path of light reflected from said bevelled surface, an elongate scale plate of transparent light transmitting material overlying said scale, a flattened surface on one side edge of said scale plate at a central location on said plate in face to face abutment with the flattened surface on said cylindrical member, and a pair of oppositely inclined reflecting surfaces on said scale plate located to reflect light entering said scale plate through the flattened surface thereon toward the opposite ends of said scale plate.

References Cited in the file of this patent

UNITED STATES PATENTS

| | | |
|---|---|---|
| 2,272,806 | Klein et al. | Feb. 10, 1942 |
| 2,520,028 | Biskind | Aug. 22, 1950 |
| 2,724,766 | Hawley et al. | Nov. 22, 1955 |
| 2,837,052 | Viret | June 3, 1958 |
| 2,868,960 | Appel et al. | Jan. 13, 1959 |
| 2,914,021 | Blackwell | Nov. 24, 1959 |
| 2,918,034 | Neugass | Dec. 22, 1959 |